United States Patent [19]
Bristol

[11] Patent Number: 5,054,904
[45] Date of Patent: Oct. 8, 1991

[54] ASPHERIC LENS BLANK

[76] Inventor: Alexander C. Bristol, 14317 SW. 142 Ave., Miami, Fla. 33186

[21] Appl. No.: 354,713

[22] Filed: May 22, 1989

[51] Int. Cl.$^5$ .......................... G02C 7/02; G02B 3/04
[52] U.S. Cl. .................................. 351/159; 351/167; 359/708
[58] Field of Search .............................. 351/159, 167; 350/432–435

[56] References Cited

U.S. PATENT DOCUMENTS

| 4,073,578 | 2/1978 | Welsh | 351/167 |
| 4,185,897 | 1/1980 | Frieder | 351/167 |
| 4,538,887 | 9/1985 | Bristol | 351/167 |

OTHER PUBLICATIONS

Renier, G. L.; "Welsh Four-Drop Aspheric Lenses"; *Optometric Weekly*; Jun. 2, 1977; pp. 621-624.

*Primary Examiner*—Scott J. Sugarman
*Attorney, Agent, or Firm*—Gifford, Groh, Sprinkle, Patmore and Anderson

[57] ABSTRACT

The present invention provides an aspherical spectacle lens blank. The lens blank is generally circular in shape and includes a central circular zone which is surrounded by three or more concentric outer zones. For a plus power lens, the outer zones decrease in diopter refraction and, conversely, for a minus power lens, the outer zones increase in diopter refraction from the central zone and to the outer peripheral zone. The lens blank of the present invention is lighter and thinner than the previously known spectacle lens blanks.

4 Claims, 1 Drawing Sheet

ASPHERIC LENS BLANK

BACKGROUND OF THE INVENTION

I. Field of the Invention

The present invention relates generally to spectacle lens blanks and, more particularly, to an aspheric spectacle lens blank.

II. Description of the Prior Art

The previously known spectacle lens blanks typically comprise a spherical front convex surface and a spherical concave rear surface. The front and rear surfaces of the lens are formed on different radii of curvature thus providing the desired light refraction for the lens. This refraction varies between a positive amount (to correct farsightedness) and a minus amount (to correct nearsightedness).

Although these previously known lenses have adequately corrected vision for the users, they necessarily result in a relatively thick lens around the outer periphery for high negative refraction lenses and a relatively thick central portion of the lens for relatively high positive refraction lenses. These previously known lenses are not only relatively heavy and therefore uncomfortable to wear, but are also unsightly. Such thick lenses also exhibit chromatic aberration around the outer periphery of the lens for high power lenses, and spherical aberration.

SUMMARY OF THE PRESENT INVENTION

The present invention provides a spectacle lens which overcomes all of the above mentioned disadvantages of the previously known lenses.

In brief, the spectacle lens of the present invention comprises a lens having an aspheric front surface. More specifically, the lens of the present invention comprises a central circular zone which is surrounded by several concentric zones. The refraction of the concentric zones decreases for positive refraction lenses and, conversely, increases for negative refraction lenses.

Since the front surface of the lens is aspheric, the spectacle lens of the present invention is thinner and more lightweight than the previously known spectacle lenses. In particular, the lens of the present invention has a thinner outer periphery for negative refractive lenses and, similarly, a thinner central portion for positive refractive lenses than the previously known lenses.

The lens of the present invention can also include a flat top bifocal segment as well as a round top bifocal segment, or other multifocal types.

In the preferred embodiment of the invention, the lens is formed with CR-39 which has an ABBE value of 59. High index materials may also be utilized.

BRIEF DESCRIPTION OF THE DRAWING

A better understanding of the present invention will be had upon reference to the following detailed description, when read in conjunction with the accompanying drawing, wherein like reference characters refer to like parts throughout the several views, and in which.

DETAILED DESCRIPTION OF PREFERRED EMBODIMENTS OF THE PRESENT INVENTION

Figure 1:
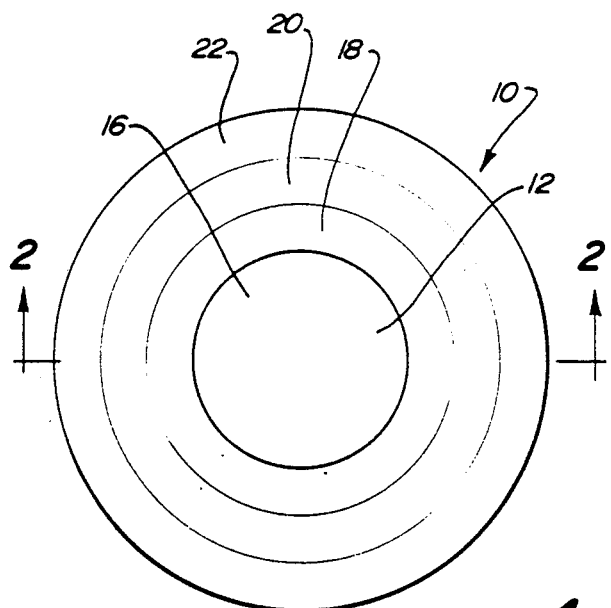
FIG. 1 is a front plan view illustrating a preferred embodiment of the present invention.
Figure 2:
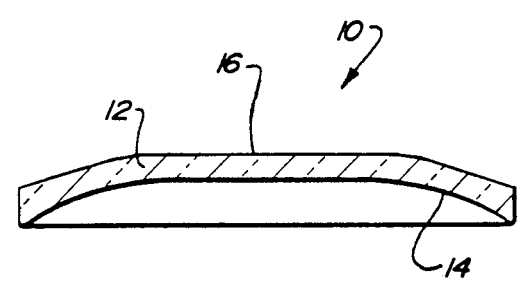
FIG. 2 is a side view of the embodiment shown in FIG. 1.

With reference first to FIGS. 1 and 2, a preferred embodiment of the lens blank of the present invention is thereshown and comprises a lens body 10 constructed of a transparent material. Although any conventional transparent material can be used, preferably CR-39, i.e. a plastic material, having an ABBE value of 59 is used in order to reduce chromatic aberration. Additionally, the lens blank illustrated in FIGS. 1 and 2, has a minus refractive air designed to correct nearsightedness.

The lens body 10 includes a generally convex front surface 12 and a generally concave rear surface 14. As described below, however, the front surface 12 is not spherical in shape.

More specifically, the front surface 12 is divided into a central circular zone 16 surrounded by at least three concentric zones 18, 20 and 22. As described later, more zones can also be used. As used herein, the value C refers only to the refractive power, i.e. the inverse radius in meters, of the front surface of the lens.

The zones 16-22 of the lens body 10 are formed in accordance with the following table:

| Zone Number | Diameter (mm) | Power (Diopters) |
|---|---|---|
| 16 | 45 ± 10 | C |
| 18 | 55 ± 7 | C + 1.0 |
| 20 | 65 ± 7 | C + 2.5 |
| 22 | 75 ± 05 | C + 4.0 |

Where C equals the lens power in diopters of the optical center 16, the value of C typically ranges from between 0-10 diopters.

From the above table, it can be seen that the lens body 10 of the present invention comprises a relatively large central zone 16 surrounded by three essentially equal radial width zones 18-22. Furthermore, the refraction increases a single diopter from the central zone 16 and to the first inner concentric zone 18. Thereafter, the refraction increases by 1.5 diopters from the zone 18 to the zone 20 and then to the outer peripheral zone 22.

Figure 3:
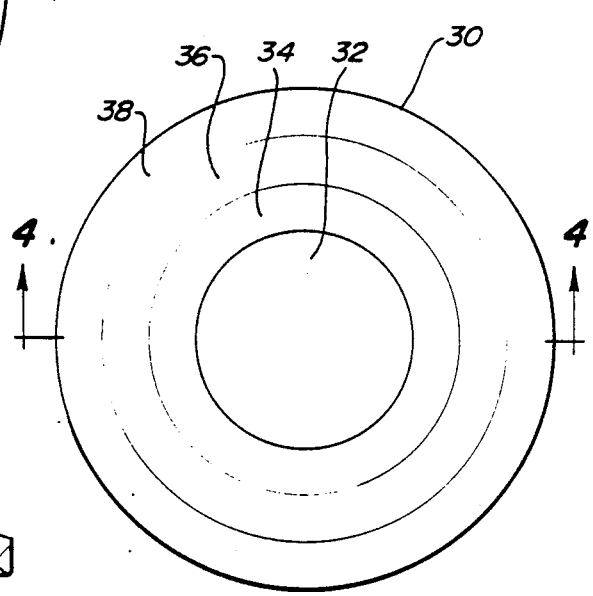
FIG. 3 is a view similar to FIG. 1 but showing a second preferred embodiment.
Figure 4:
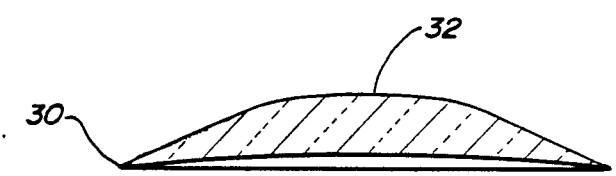
FIG. 4 is a view similar to FIG. 2 but of the second preferred embodiment of the present invention.

With reference now to FIGS. 3 and 4, a second preferred embodiment of the lens blank of the present invention is thereshown with a positive refraction for the correction of farsightedness. The lens blank comprises a lens body 30 which, like the lens body 10, is preferably constructed of CR-39 plastic material. Other transparent materials can, of course, alternatively be used.

The lens body 30 includes a central circular zone 32 surrounded by three concentric zones 34, 36 and 38. These zones are formed in accordance with the following table:

| Zone Number | Diameter (mm) | Power (Diopters) |
|---|---|---|
| 32 | 45 ± 10 | C |
| 34 | 55 ± 7 | C − .75 |
| 36 | 65 ± 7 | C − 1.25 |
| 38 | 75 ± 05 | C − 2.0 |

Where C equals the lens power in diopters at the optical center 32 of the lens blank 30. The value of C typically ranges between 2 and −14 diopters.

From the foregoing table, it can be seen that the lens body 30 includes zones of substantially the same size as the lens body 10 (FIG. 1). However, unlike the lens body 10, the refraction for the lens body 30 increases from the central zone 32 and to the outer zone 38. The amount of the increase is set forth in the above table.

By Applicant's use of aspheric anterior surface for the lens blank, the lens blank of the present invention achieves a much thinner outer periphery for comparable minus lenses than the previously known devices. Similarly, the lens blank of the present invention achieves a much thinner central zone for plus lenses as contrasted with comparable previously known lens blanks. The net effect, therefore, is to achieve a much more lightweight and aesthetically pleasing lens than the previously known lenses. Additionally, Applicant's lens exhibits less chromatic aberration around the outer periphery for the lenses, and a diminution of spherical aberration.

Although the lens has been described as having a central zone surrounded by three concentric zones, it will be understood that more zones may also be used. As the number of zones increases, however, the amount of diopter change from one zone and to the next decreases. For example, if the total diopter change from the central to the outer zone was "X", six zones with $\frac{1}{2}$X change per zone would achieve the same end as more zones with $\frac{1}{3}$X change per zone.

Having described my invention, however, many modifications thereto will become apparent to those skilled in the art to which it pertains without deviation from the spirit of the invention as defined by the scope of the appended claims.

I claim:

1. A lens blank comprising:

a generally circular lens blank having a posterior surface and an aspherical anterior surface with an optical center, said anterior surface having a circular central zone encircled by three concentric zones formed in accordance with the following table:

| Zone | Diameter (mm) | Power (Diopters) |
| --- | --- | --- |
| Central Zone | 45 ± 10 | C |
| First Concentric Zone | 55 ± 7 | C - .75 |
| Second Concentric Zone | 65 ± 7 | C - 1.25 |
| Third Concentric Zone | 75 ± 05 | C - 2.0 | where C equals the lens power at said optical center.

2. The invention as described in claim 1, wherein said lens blank comprises:

a generally circular lens blank having a posterior surface and an aspherical anterior surface with an optical center, said anterior surface having a circular central zone encircled by three or more concentric zones formed in accordance with the following table:

| Zone | Diameter (mm) | Power (Diopters) |
| --- | --- | --- |
| Central Zone | 45 ± 10 | C |
| First Concentric Zone | 55 ± 7 | C - .75 |
| Second Concentric Zone | 65 ± 7 | C - 1.25 |
| Third Concentric Zone | 75 ± 05 | C - 2.0 | where C equals the lens power at said optical center, said at least one of said concentric zones further dividable into twice its number of concentric zones, said divided zones exhibiting a one-half change in diopter power as compared to the diopter power of an undivided zone.

3. A lens blank comprising:

a generally circular lens blank having a posterior surface and an aspherical anterior surface with an optical center, said anterior surface having a circular central zone encircled by three concentric zones formed in accordance with the following table:

| Zone | Diameter (mm) | Power (Diopters) |
| --- | --- | --- |
| Central Zone | 45 ± 10 | C |
| First Concentric Zone | 55 ± 7 | C − 1.0 |
| Second Concentric Zone | 65 ± 7 | C − 2.5 |
| Third Concentric Zone | 75 ± 05 | C − 4.0 | where C equals the lens power at said optical center.

4. The invention as described in claim 3, wherein said lens blank comprises:

a generally circular lens blank having a posterior surface and an aspherical anterior surface with an optical center, said anterior surface having a circular central zone encircled by three or more concentric zones formed in accordance with the following table:

| Zone | Diameter (mm) | Power (Diopters) |
| --- | --- | --- |
| Central Zone | 45 ± 10 | C |
| First Concentric Zone | 55 ± 7 | C − 1.0 |
| Second Concentric Zone | 65 ± 7 | C − 2.5 |
| Third Concentric Zone | 75 ± 05 | C − 4.0 | where C equals the lens power at said optical center, said at least one of said concentric zones further dividable into twice its number of concentric zones, said divided zones exhibiting a one-half change in diopter power as compared to the diopter power of an undivided zone.

* * * * *